(12) United States Patent
Takahashi et al.

(10) Patent No.: US 11,491,915 B2
(45) Date of Patent: Nov. 8, 2022

(54) VEHICLE PERIPHERY MONITORING DEVICE

(71) Applicant: TOYOTA JIDOSHA KABUSHIKI KAISHA, Toyota (JP)

(72) Inventors: Yuki Takahashi, Seto (JP); Yohei Satomi, Okazaki (JP); Tomoaki Iida, Okazaki (JP); Jumpei Inagaki, Toyota (JP); Tomohito Higuma, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/381,759

(22) Filed: Jul. 21, 2021

(65) Prior Publication Data

US 2022/0063499 A1   Mar. 3, 2022

(30) Foreign Application Priority Data

Sep. 1, 2020 (JP) .............................. JP2020-146806

(51) Int. Cl.
*B60R 1/00* (2022.01)
*H04N 5/262* (2006.01)
*H04N 5/265* (2006.01)
*G06V 20/56* (2022.01)

(52) U.S. Cl.
CPC .............. *B60R 1/002* (2013.01); *G06V 20/56* (2022.01); *H04N 5/265* (2013.01); *H04N 5/2628* (2013.01); *B60R 2300/105* (2013.01); *B60R 2300/20* (2013.01); *B60R 2300/303* (2013.01); *B60R 2300/8066* (2013.01)

(58) Field of Classification Search
None
See application file for complete search history.

(56) References Cited

U.S. PATENT DOCUMENTS

| 11,341,614 | B1* | 5/2022 | Chen | G06T 3/4038 |
| 2018/0154831 | A1* | 6/2018 | Spencer | H04N 5/23238 |
| 2018/0249093 | A1* | 8/2018 | Saeki | H04N 5/247 |
| 2019/0191081 | A1 | 6/2019 | Shidochi et al. | |

FOREIGN PATENT DOCUMENTS

JP      2019-110492 A      7/2019

* cited by examiner

*Primary Examiner* — Rebecca A Volentine
(74) *Attorney, Agent, or Firm* — Sughrue Mion, PLLC (57) ABSTRACT

In a first case a trimmed image generating section carries out trimming such that respective lateral direction lengths of a rear processed image and rear lateral processed images in the combined image are equal, and in a second case in which the trimmed image generating section judges that there is information that is included in the images of the first overlapping regions and is not included in the images of the second overlapping regions and information that should be included in the combined image, the trimmed image generating section carries out trimming such that the information that should be included in the combined image remains in the rear lateral processed images, and, as compared with the first case, the lateral direction length of the rear processed image in the combined image is short, and the lateral direction lengths of the rear lateral processed images in the combined image are long.

3 Claims, 11 Drawing Sheets

VEHICLE PERIPHERY MONITORING DEVICE

CROSS-REFERENCE TO RELATED APPLICATION

This application claims priority under 35 USC 119 from Japanese Patent Application No. 2020-146806 filed on Sep. 1, 2020, the disclosure of which is incorporated by reference herein in its entirety.

BACKGROUND

Technical Field

The present disclosure relates to a vehicle periphery monitoring device.

Related Art

Japanese Patent Application Laid-Open (JP-A) No. 2019-110492 discloses a technique relating to an image display device that is installed in a vehicle and displays an image of the vehicle rear side. To explain this briefly, this related art technique generates a combined image by combining, at an image combining section, a rear image that is captured by a rear camera that can capture images of the rear side of the vehicle, and rear lateral images that are captured by a rear left lateral camera and a rear right lateral camera that can capture images of the rear lateral sides of the vehicle, and displays this combined image on a display.

At the time of generating the combined image, the image combining section changes the proportions that the rear image and the rear lateral images occupy in the combined image, on the basis of at least one of the distance between the vehicle and a vehicle at the rear thereof, and the vehicle speed of the vehicle. In this related art technique, in a case in which a vehicle at the rear exists, the visibility of that vehicle at the rear in the displayed image can be ensured appropriately.

SUMMARY

However, in the case of the above-described related art technique, for regions that are other than the region in which the vehicle at the rear exists, there is room for improvement with regard to the point of displaying a more suitable image in accordance with the situation.

In view of the above-described circumstances, an object of the present disclosure is to provide a vehicle periphery monitoring device that can display a combined image that is more suitable in accordance with situation, by using images that are captured by a rear imaging section and rear lateral imaging sections respectively.

A vehicle periphery monitoring device of a first aspect of the present disclosure includes: a display portion that is provided within a cabin of a vehicle, and that displays an image; a rear imaging section that is provided at the vehicle and captures images of a rear side of the vehicle; rear lateral imaging sections that are provided at the vehicle, further toward vehicle transverse direction outer sides than the rear imaging section, and that capture images of rear lateral sides of the vehicle; a trimmed image generating section that, by trimming a rear image captured by the rear imaging section and rear lateral images captured by the rear lateral imaging sections such that regions that are objects of imaging are continuous without overlapping, generates a rear processed image from the rear image and rear lateral processed images from the rear lateral images; an image combining section that combines the rear processed image and the rear lateral processed images, which were respectively generated by the trimmed image generating section, and generates a single combined image; and a display control section that displays the combined image, which was generated by the image combining section, on the display portion, wherein: in a first case in which the trimmed image generating section determines that there is no information that is included in images of first overlapping regions of the rear lateral images that overlap the rear image and is not included in images of second overlapping regions of the rear image that overlap the rear lateral images, or that, if there is such information, the information is not information that should be included in the combined image, the trimmed image generating section carries out trimming such that respective lateral direction lengths of the rear processed image and the rear lateral processed images in the combined image are equal, and, in a second case in which the trimmed image generating section determines that there is information that is included in the images of the first overlapping regions and is not included in the images of the second overlapping regions and is information that should be included in the combined image, the trimmed image generating section carries out trimming such that the information that should be included in the combined image remains in the rear lateral processed images, and, as compared with the first case, the lateral direction length of the rear processed image in the combined image is shorter, and the lateral direction lengths of the rear lateral processed images in the combined image are longer.

In accordance with the above-described structure, the rear imaging section that is provided at the vehicle captures images of the rear side of the vehicle. The rear lateral imaging sections, which are provided at the vehicle at further toward the vehicle transverse direction outer sides than the rear imaging section, capture images of the rear lateral sides of the vehicle. Due to the trimmed image generating section trimming the rear image captured by the rear imaging section and the rear lateral images captured by the rear lateral imaging sections such that the regions that are the objects of imaging thereof are continuous without overlapping, generates a rear processed image from the rear image and generates rear lateral processed images from the rear lateral images. Moreover, the image combining section combines the rear processed image and the rear lateral processed images, which were respectively generated by the trimmed image generating section, and generates a single combined image. The display control section displays the combined image, which was generated by the image combining section, on the display portion that is within the vehicle cabin.

Here, in a first case in which the trimmed image generating section determines that there is no information that is included in images of first overlapping regions of the rear lateral images that overlap the rear image and is not included in images of second overlapping regions of the rear image that overlap the rear lateral images, or that, if there is such information, the information is not information that should be included in the combined image, the trimmed image generating section carries out trimming such that respective lateral direction lengths of the rear processed image and the rear lateral processed images in the combined image are equal. Further, in a second case in which the trimmed image generating section determines that there is information that is included in the images of the first overlapping regions and is not included in the images of the second overlapping regions and is information that should be included in the combined image, the trimmed image generating section carries out trimming such that the information that should be included in the combined image remains in the rear lateral processed images, and, as compared with the first case, the lateral direction length of the rear processed image in the combined image is shorter, and the lateral direction lengths of the rear lateral processed images in the combined image are longer. Due thereto, a predetermined object which, in the overlapping regions of the rear image and the rear lateral images, does not exist in the rear image and does exist in a rear lateral image, can be included in the combined image.

A vehicle periphery monitoring device of a second aspect of the present disclosure includes, in the structure of the vehicle periphery monitoring device of the first aspect, a feature amount computing section that respectively computes feature amounts of images at the first overlapping regions and feature amounts of images at the second overlapping regions, wherein the trimmed image generating section determines that the first case exists in a case of determining, based on results of computing by the feature amount computing section, that a correspondence ratio of the feature amounts of the images at the first overlapping regions and the feature amounts of the images at the second overlapping regions exceeds a predetermined threshold value, and determines that the second case exists in a case of determining, based on the results of computing by the feature amount computing section, that the correspondence ratio of the feature amounts of the images at the first overlapping regions and the feature amounts of the images at the second overlapping regions is less than or equal to the predetermined threshold value.

In accordance with the above-described structure, the feature amount computing section respectively computes feature amounts of images at the first overlapping regions and feature amounts of images at the second overlapping regions. Here, in a case in which the trimmed image generating section determines, based on results of computing by the feature amount computing section, that the correspondence ratio of the feature amounts of the images at the first overlapping regions and the feature amounts of the images at the second overlapping regions exceeds a predetermined threshold value, the trimmed image generating section determines that there is no information that is included in the images of the first overlapping regions and is not included in the images of the second overlapping regions, or that, even if there is such information, such information is not information that should be included in the combined image, and carries out trimming such that respective lateral direction lengths of the rear processed image and the rear lateral processed images in the combined image are equal. Further, in a case in which the trimmed image generating section determines, based on the results of computing by the feature amount computing section, that the correspondence ratio of the feature amounts of the images at the first overlapping regions and the feature amounts of the images at the second overlapping regions is less than or equal to the predetermined threshold value, the trimmed image generating section determines that there is information that is included in the images of the first overlapping regions and is not included in the images of the second overlapping regions and information that should be included in the combined image, and carries out trimming such that the information that should be included in the combined image remains in the rear lateral processed images, and, as compared with the first case, the lateral direction length of the rear processed image in the combined image is shorter, and the lateral direction lengths of the rear lateral processed images in the combined image are longer.

A vehicle periphery monitoring device of a third aspect of the present disclosure includes, in the structure of the vehicle periphery monitoring device of the first aspect, an object detecting section that respectively detects objects that are present in the first overlapping regions and objects that are present in the second overlapping regions, wherein the trimmed image generating section determines that the first case exists in a case of determining, based on results of detection by the object detecting section, that no object is present only in the first overlapping regions among the first overlapping regions and the second overlapping regions, and determines that the second case exists in a case of determining, based on the results of detection by the object detecting section, that an object is present only in the first overlapping regions among the first overlapping regions and the second overlapping regions.

In accordance with the above-described structure, the object detecting section respectively detects objects that exist in the first overlapping regions and objects that exist in the second overlapping regions. Here, in a case in which, based on results of detection by the object detecting section, the trimmed image generating section determines that there is no object that exists only in the first overlapping regions among the first overlapping regions and the second overlapping regions, the trimmed image generating section determines that there is no information that is included in the images of first overlapping regions and is not included in the images of the second overlapping regions, or that, if there is such information, such information is not information that should be included in the combined image, and carries out trimming such that respective lateral direction lengths of the rear processed image and the rear lateral processed images in the combined image are equal. Further, in a case in which, based on the results of detection by the object detecting section, the trimmed image generating section determines that there is an object that exists only in the first overlapping regions among the first overlapping regions and the second overlapping regions, the trimmed image generating section determines that there is information that is included in the images of the first overlapping regions and is not included in the images of the second overlapping regions and information that should be included in the combined image, and carries out trimming such that the information that should be included in the combined image remains in the rear lateral processed images, and, as compared with the first case, the lateral direction length of the rear processed image in the combined image is short, and the lateral direction lengths of the rear lateral processed images in the combined image are long.

As described above, in accordance with the vehicle periphery monitoring device of the present disclosure, there is provided a vehicle periphery monitoring device that can display a combined image that is more suitable in accordance with the situation, by using images that are captured by a rear imaging section and rear lateral imaging sections respectively.

DETAILED DESCRIPTION

[First Embodiment]

A vehicle periphery monitoring device relating to a first embodiment is described by using FIG. 1 through FIG. 9. Note that arrow FR that is shown appropriately in these drawings indicates the vehicle front side, and arrow W indicates the vehicle transverse direction.

Figure 1:
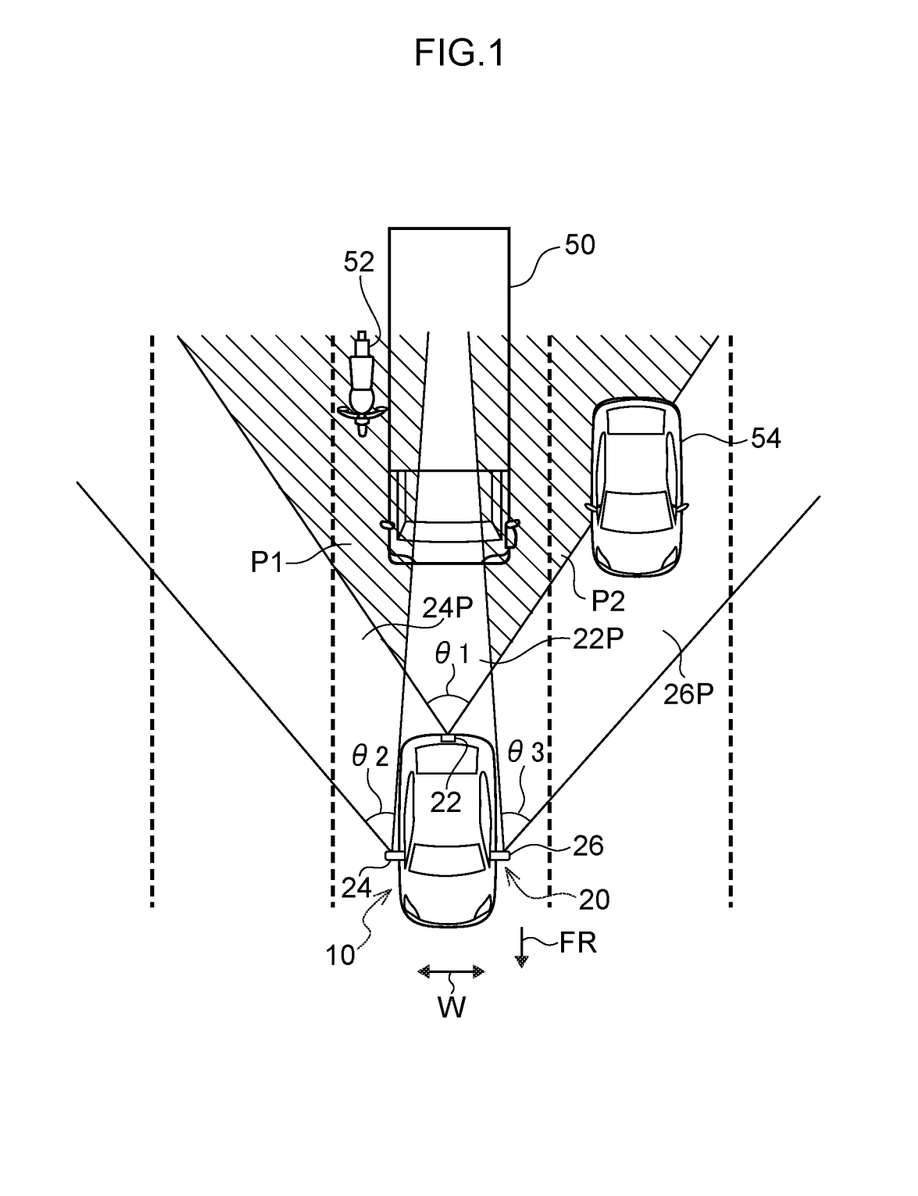
FIG. 1 is a plan view schematically showing a vehicle in which a vehicle periphery monitoring device relating to a first embodiment is installed, and a periphery of the vehicle.

A vehicle 10, in which is installed a vehicle periphery monitoring device 20 relating to a first embodiment, and the periphery of the vehicle 10 are shown in a schematic plan view in FIG. 1. Note that FIG. 1 shows a state in which a truck 50 that is another vehicle is traveling at the rear of the vehicle 10, and a motorbike (motorcycle) 52 is traveling at the vehicle right side (the left side in the drawing) of the truck 50. Further, a passenger vehicle 54 that is another vehicle is traveling at the vehicle left side (the right side in the drawing) of the truck 50, in the lane that is adjacent at the left side (the right side in the drawing) of the lane in which the vehicle 10 is traveling.

Figure 2A:
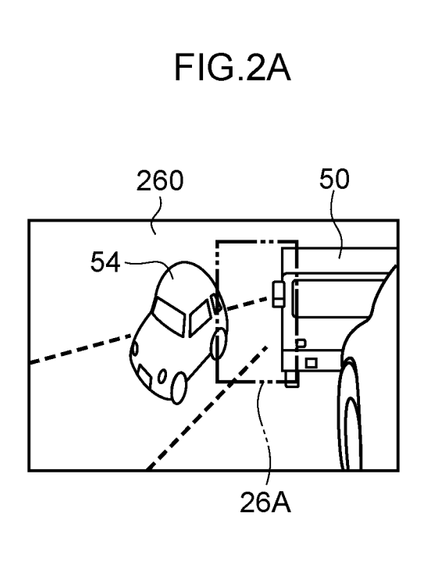
FIG. 2A is an image drawing showing an example of an image that is captured by a left side camera of the vehicle periphery monitoring device relating to the first embodiment.
Figure 2B:
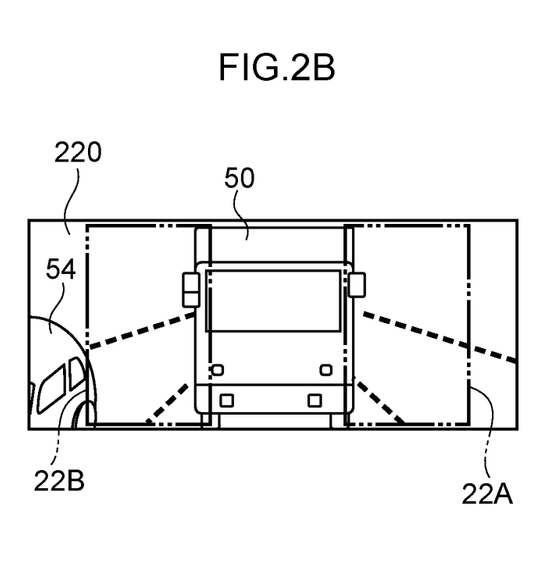
FIG. 2B is an image drawing showing an example of an image that is captured by a rear camera of the vehicle periphery monitoring device relating to the first embodiment.

As shown in FIG. 1, the vehicle periphery monitoring device 20 has a rear camera 22, which serves as the rear imaging section, at the vehicle transverse direction central portion of a vehicle rear end portion (e.g., at the upper side of the rear license plate). The rear camera 22 is provided at the vehicle 10, and captures image of the rear side of the vehicle 10. In FIG. 1, an example of the image angle of the rear camera 22 is shown as θ1, and an example of the imaging range of the rear camera 22 is designated by 22P. Note that blind spot regions are included in portions of the imaging range 22P of the rear camera 22 in FIG. 1, and, in the state shown in FIG. 1, the motorbike 52 cannot be imaged by the rear camera 22. The rear camera 22 is an element that can also be understood as being an image sensor. An example of a rear image 220 that is captured by the rear camera 22 is shown in FIG. 2B. As shown in FIG. 2B, the rear image 220 that is captured by the rear camera 22 is an image that is mirror-reversed.

As shown in FIG. 1, the vehicle periphery monitoring device 20 has a right side camera 24, which serves as the rear lateral imaging section, at the lateral portion that is at the right side of the vehicle 10 (e.g., the position at which the right door mirror is usually provided). Further, the vehicle periphery monitoring device 20 has a left side camera 26, which serves as the rear lateral imaging section, at the lateral portion that is at the left side of the vehicle 10 (e.g., the position at which the left door mirror is usually provided). Both the right side camera 24 and the left side camera 26 are provided further toward the vehicle transverse direction outer sides than the rear camera 22 at the vehicle 10. The right side camera 24 captures images of the rear right side of the vehicle 10, and the left side camera 26 captures images of the rear left side of the vehicle 10.

Figure 2C:
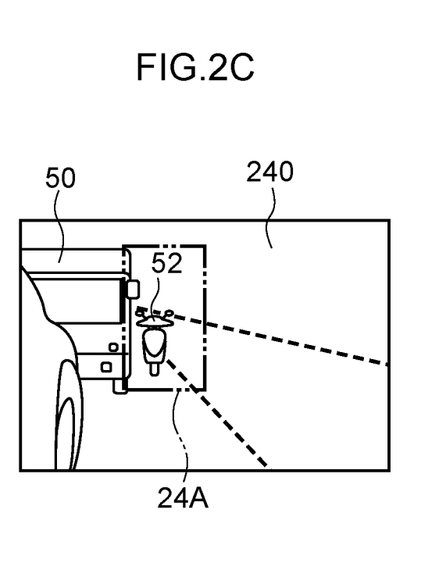
FIG. 2C is an image drawing showing an example of an image that is captured by a right side camera of the vehicle periphery monitoring device relating to the first embodiment.

In FIG. 1, an example of the image angle of the right side camera 24 is shown as θ2, and an example of the imaging range of the right side camera 24 is designated by 24P. Further, an example of the image angle of the left side camera 26 is shown as θ3, and an example of the imaging range of the left side camera 26 is designated by 26P. The right side camera 24 and the left side camera 26 are elements that can also be understood as being image sensors. An example of a rear lateral image 260 that is captured by the left side camera 26 is shown in FIG. 2A. An example of a rear lateral image 240 that is captured by the right side camera 24 is shown in FIG. 2C. As shown in FIG. 2A, the rear lateral image 260 that is captured by the left side camera 26 is an image that is mirror-reversed. Further, as shown in FIG. 2C, the rear lateral image 240 that is captured by the right side camera 24 is an image that is mirror-reversed.

Note that, in FIG. 1, overlapping region P1 of the imaging range 22P of the rear camera 22 and the imaging range 24P of the right side camera 24 is marked by hatching, and overlapping region P2 of the imaging range 22P of the rear camera 22 and the imaging range 26P of the left side camera 26 is marked by hatching. Further, in FIG. 2A, of the rear lateral image 260, a first overlapping region that overlaps with the rear image 220 (see FIG. 2B) is designated by 26A. In FIG. 2B, of the rear image 220, a second overlapping region that overlaps with the rear lateral image 260 (see FIG. 2A) is designated by 22B. Further, in FIG. 2C, of the rear lateral image 240, a first overlapping region that overlaps with the rear image 220 (see FIG. 2B) is designated by 24A. In FIG. 2B, of the rear image 220, a second overlapping region that overlaps with the rear lateral image 240 (see FIG. 2C) is designated by 22A.

Figure 3:
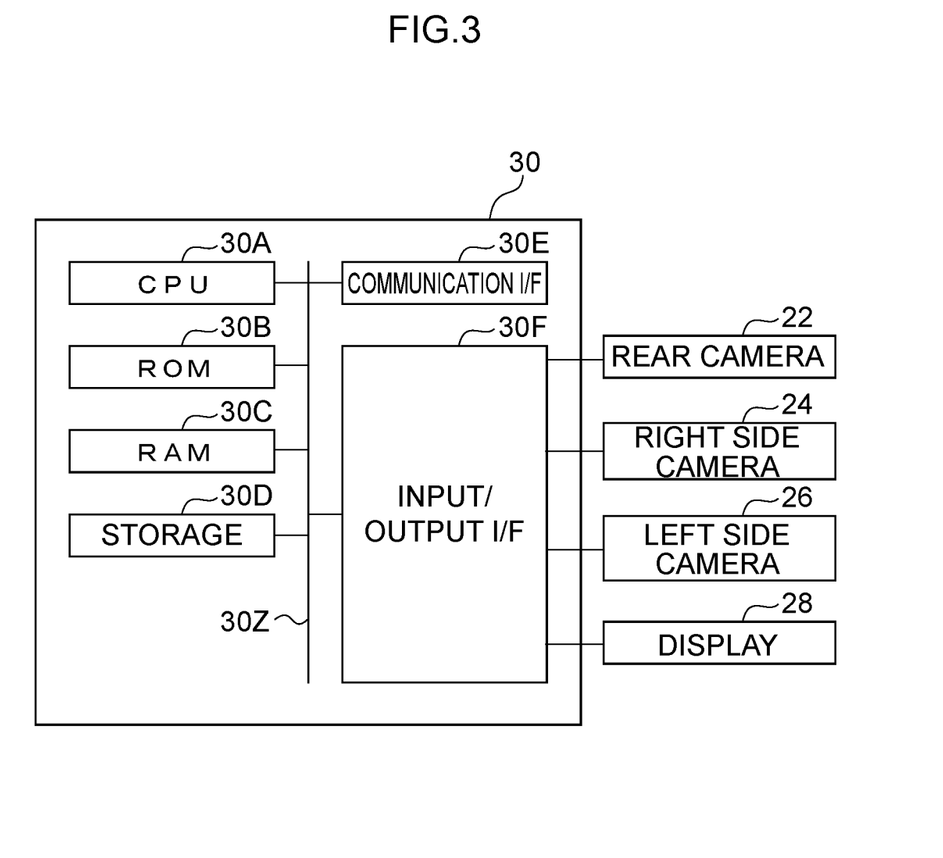
FIG. 3 is a block drawing showing an example of hardware structures of the vehicle periphery monitoring device relating to the first embodiment.

An example of hardware structures of the vehicle periphery monitoring device 20 is shown in a block drawing in FIG. 3.

As shown in FIG. 3, the vehicle periphery monitoring device 20 has an ECU (Electrical Control Unit) 30 to which the above-described rear camera 22, right side camera 24 and left side camera 26 are connected. A display 28 that serves as the display portion is connected to the ECU 30.

The display 28 is provided at the front portion of the vehicle cabin interior of the vehicle 10, and displays images (video images).

The ECU 30 is structured to include a CPU (Central Processing Unit: processor) 30A, a ROM (Read Only Memory) 30B that serves as a recording section, a RAM (Random Access Memory) 30C, a storage 30D, a communication I/F (Inter Face) 30E and an input/output I/F 30F. The CPU 30A, the ROM 30B, the RAM 30C, the storage 30D, the communication I/F 30E and the input/output I/F 30F are connected so as to be able to communicate with one another via a bus 30Z.

The CPU 30A is a central computing processing unit, and can execute various programs and can control the respective sections. Namely, the CPU 30A reads-out programs from the ROM 30B or the storage 30D, and executes the programs by using the RAM 30C as a workspace. The CPU 30A carries out control of the above-described respective structures and various computing processings in accordance with programs that are recorded in the ROM 30B or the storage 30D.

Various programs and various data are stored in the ROM 30B. As an example, an image display control program is stored in the ROM 30B. The RAM 30C temporarily stores programs or data as a workspace. The storage 30D is structured by a storage device such as an HDD (Hard Disk Drive) or an SSD (Solid State Drive) or the like, and stores various programs and various data. The communication I/F 30E is an interface for the ECU 30 to communicate with other devices. Wireless communication standards such as, for example, 4G, 5G, WiFi® or the like are used for this communication.

The input/output I/F 30F is an interface for communication with respective devices that are installed in the vehicle 10. As an example, the rear camera 22, the right side camera 24, the left side camera 26 and the display 28 are connected to the ECU 30 of the present embodiment via the input/output I/F 30F. Note that the rear camera 22, the right side camera 24, the left side camera 26 and the display 28 may be directly connected to the bus 30Z.

Figure 4:
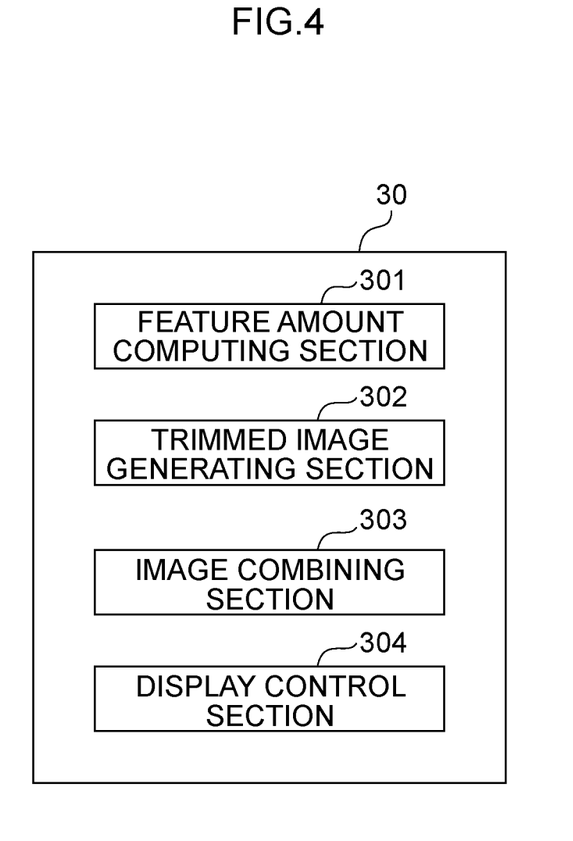
FIG. 4 is a block drawing showing an example of functional structures of an ECU of the vehicle periphery monitoring device relating to the first embodiment.

An example of the functional structures of the ECU 30 is shown in a block drawing in FIG. 4. As shown in FIG. 4, the ECU 30 has, as the functional structures thereof, a feature amount computing section 301, a trimmed image generating section 302, an image combining section 303, and a display control section 304. The feature amount computing section 301, the trimmed image generating section 302, the image combining section 303 and the display control section 304 are realized by the CPU 30A reading-out and executing the image display control program that is stored in the ROM 30B.

The feature amount computing section 301 computes feature amounts of the images at the first overlapping regions 24A, 26A and feature amounts of the images at the second overlapping regions 22A, 22B, respectively.

By trimming the rear image 220 that was captured by the rear camera 22 and the rear lateral images 240, 260 that were captured by the right side camera 24 and the left side camera 26 such that the regions that are the respective objects of imaging thereof are continuous without overlapping, the trimmed image generating section 302 generates a rear processed image 221 from the rear image 220 and generates rear lateral processed images 241, 261 from the rear lateral images 240, 260.

Figure 7:
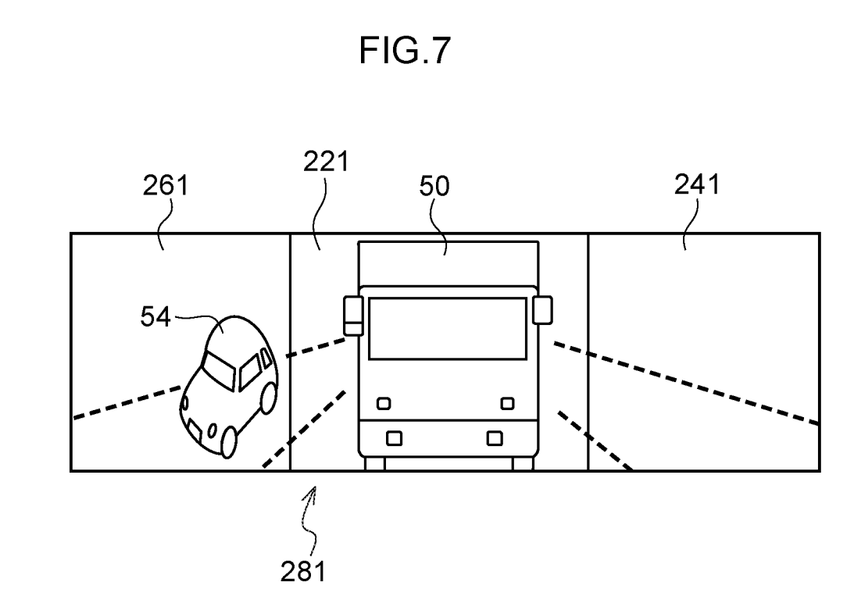
FIG. 7 is an image drawing of a combined image in the case of FIG. 6.
Figure 9:
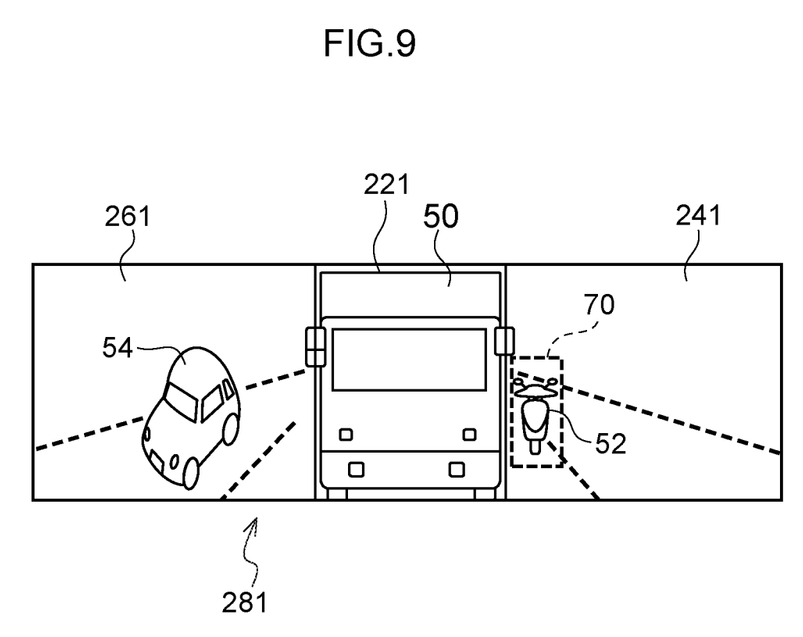
FIG. 9 is an image drawing of a combined image in the case of FIG. 8.

Further, in a first case in which the trimmed image generating section 302 determines that there is no "information that is included in the images of the first overlapping regions 24A, 26A and is not included in the images of the second overlapping regions 22A, 22B", or that, even if there is such information, such information is not information that should be included in a combined image 281, the trimmed image generating section 302 carries out trimming such that the respective lateral direction lengths of the rear processed image 221 and the rear lateral processed images 241, 261 that are in the combined image 281 shown in FIG. 7 are equal. In a second case in which the trimmed image generating section 302 determines that there is information that is included in the images of the first overlapping regions 24A, 26A and is not included in the images of the second overlapping regions 22A, 22B shown in FIG. 2A, FIG. 2B and FIG. 2C and information that should be included in the combined image 281, the trimmed image generating section 302 carries out trimming such that the information that should be included in the combined image 281 shown in FIG. 9 remains in the rear lateral processed images 241, 261, and, as compared with the above-described first case, the lateral direction length of the rear processed image 221 in the combined image 281 is short, and the lateral direction lengths of the rear lateral processed images 241, 261 in the combined image 281 are long. Note that, the borderlines of the rear processed image 221 and the rear lateral processed images 241, 261 are illustrated in FIG. 7 and FIG. 9 for convenience of explanation, but these borderlines do not exist in the actual combined image 281.

In a case in which the trimmed image generating section 302 that is shown in FIG. 4 determines, on the basis of the results of computation by the feature amount computing section 301, that the correspondence ratio of feature amounts of the images at the first overlapping regions 24A, 26A and the feature amounts of the images at the second overlapping regions 22A, 22B, which are shown in FIG. 2A, FIG. 2B and FIG. 2C, exceeds a predetermined threshold value, the trimmed image generating section 302 determines that there is the first case. Further, in a case in which the trimmed image generating section 302 that is shown in FIG. 4 determines, on the basis of the results of computation by the feature amount computing section 301, that the correspondence ratio of the feature amounts of the images at the first overlapping regions 24A, 26A and the feature amounts of the images at the second overlapping regions 22A, 22B is less than or equal to the predetermined threshold value, the trimmed image generating section 302 determines that there is the second case. Note that the predetermined threshold value is set to a value that can be said to be appropriate for judging whether or not there is information that should be included in the combined image 281.

The image combining section 303 that is shown in FIG. 4 combines the rear processed image 221 and the rear lateral processed images 241, 261, which were respectively generated by the trimmed image generating section 302, and generates the single combined image 281. Note that, at the time of combining the images, the image combining section 303 may carry out a known image combining processing such as viewpoint converting processing or the like. The display control section 304 displays, on the display 28, the combined image 281 that has been generated by the image combining section 303.

Operation of the vehicle periphery monitoring device 20 is described next.

Figure 5:
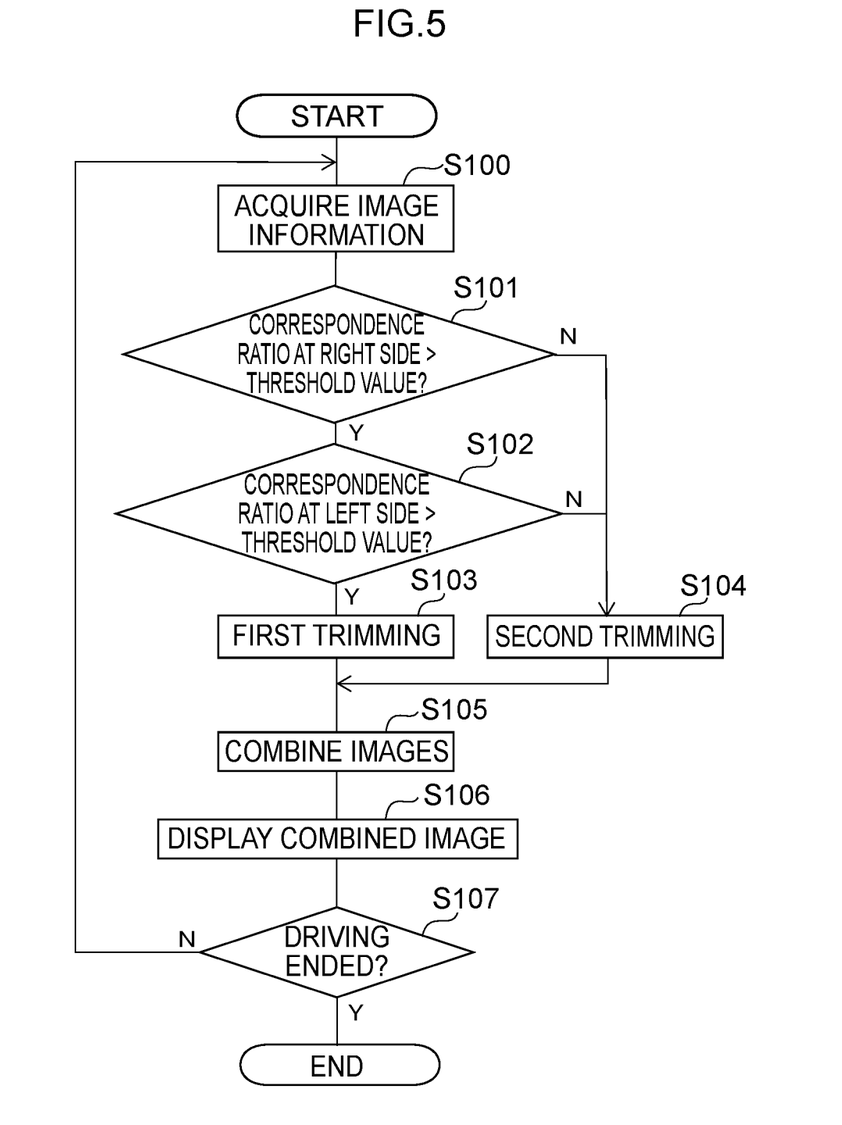
FIG. 5 is a flowchart showing an example of the flow of control processing by the ECU of the vehicle periphery monitoring device relating to the first embodiment.

An example of the flow of image display control processing by the ECU 30 is shown in a flowchart in FIG. 5. The image display control processing by the ECU 30 is carried out due to the CPU 30A reading-out the image display control program from the ROM 30B, and expanding and executing the program in the RAM 30C. As an example, execution of the image display control processing that is shown in FIG. 5 is started in a case in which the ignition switch of the vehicle 10 is turned on.

The CPU 30A acquires the rear image 220 that was captured by the rear camera 22, and acquires the rear lateral images 240, 260 that were captured by the right side camera 24 and the left side camera 26 respectively (step S100).

Figure 8:
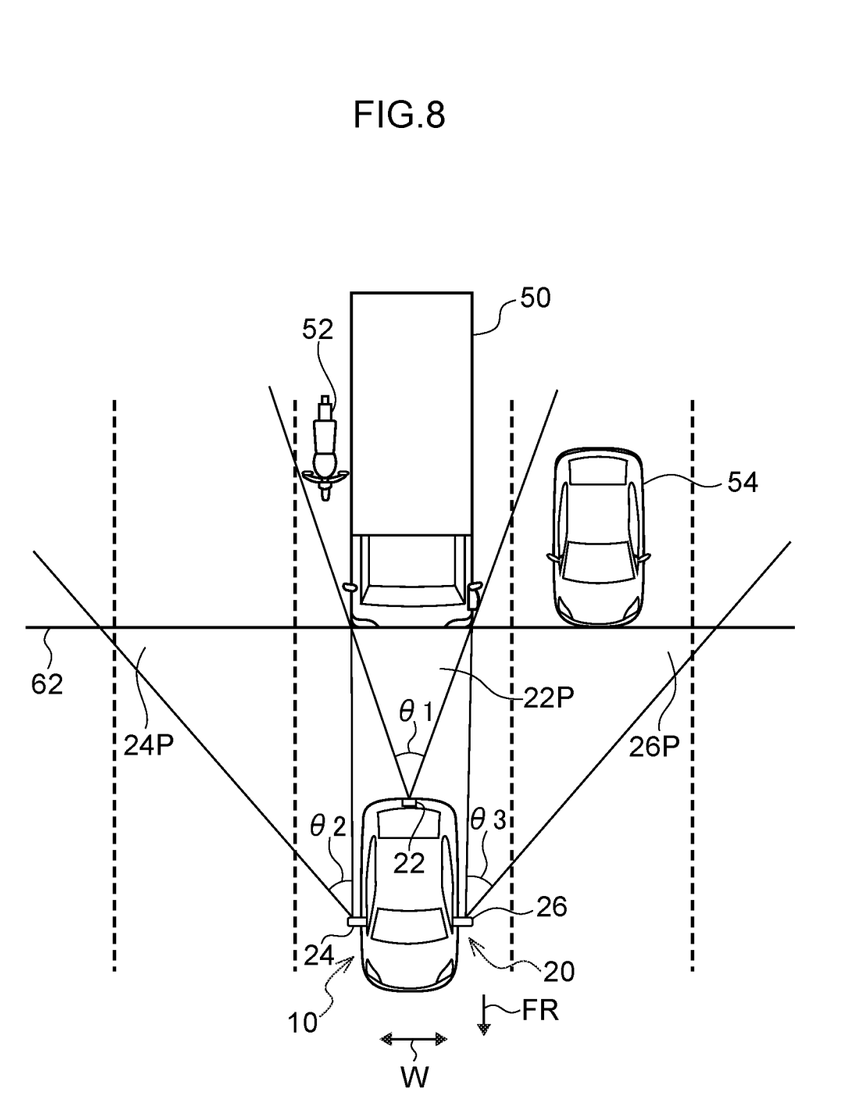
FIG. 8 is a schematic drawing for explaining a combined image in a case (a second case) in which the correspondence ratio of feature amounts in overlapping regions of images is less than or equal to the threshold value.

Next, the CPU 30A judges whether or not the correspondence ratio of a feature amount of the image at the first overlapping region 24A and the feature amount of the image at the second overlapping region 22A exceeds a predetermined threshold value (S101). In a case in which the correspondence ratio of the feature amount of the image at the first overlapping region 24A and the feature amount of the image at the second overlapping region 22A is less than or equal to the predetermined threshold value (step S101: N), the CPU 30A moves on to the processing of step S104 (to be described later). For example, a case in which the motorbike 52 is not captured by the rear camera 22 and is captured by the right side camera 24 as shown in FIG. 8 corresponds to a case in which the correspondence ratio is less than or equal to the predetermined threshold value. Returning to the flowchart of FIG. 5, in a case in which the correspondence ratio of the feature amount of the image at the first overlapping region 24A and the feature amount of the image at the second overlapping region 22A exceeds the predetermined threshold value (step S101: Y), the CPU 30A moves on to the processing of step S102. For example, a case in which imaging by the rear camera 22 and the right side camera 24 is carried out in the state shown in FIG. 6 corresponds to a case in which the correspondence ratio exceeds the predetermined threshold value.

In step S102 shown in FIG. 5, the CPU 30A judges whether or not the correspondence ratio of the feature amount of the image at the first overlapping region 26A and the feature amount of the image at the second overlapping region 22B exceeds a predetermined threshold value. In a case in which the correspondence ratio of the feature amount of the image at the first overlapping region 26A and the feature amount of the image at the second overlapping region 22B is less than or equal to the predetermined threshold value (step S102: N), the CPU 30A moves on to the processing of step S104 (to be described later). In a case in which the correspondence ratio of the feature amount of the image at the first overlapping region 26A and the feature amount of the image at the second overlapping region 22B exceeds the predetermined threshold value (step S102: Y), the CPU 30A moves on to the processing of step S103.

In step S103, the CPU 30A trims the rear image 220 and the rear lateral images 240, 260 such that the respective lengths in the lateral direction of the rear processed image 221 and the rear lateral processed images 241, 261 in the combined image 281 become equal (see FIG. 7), and moves on to the processing of step S105.

Figure 6:
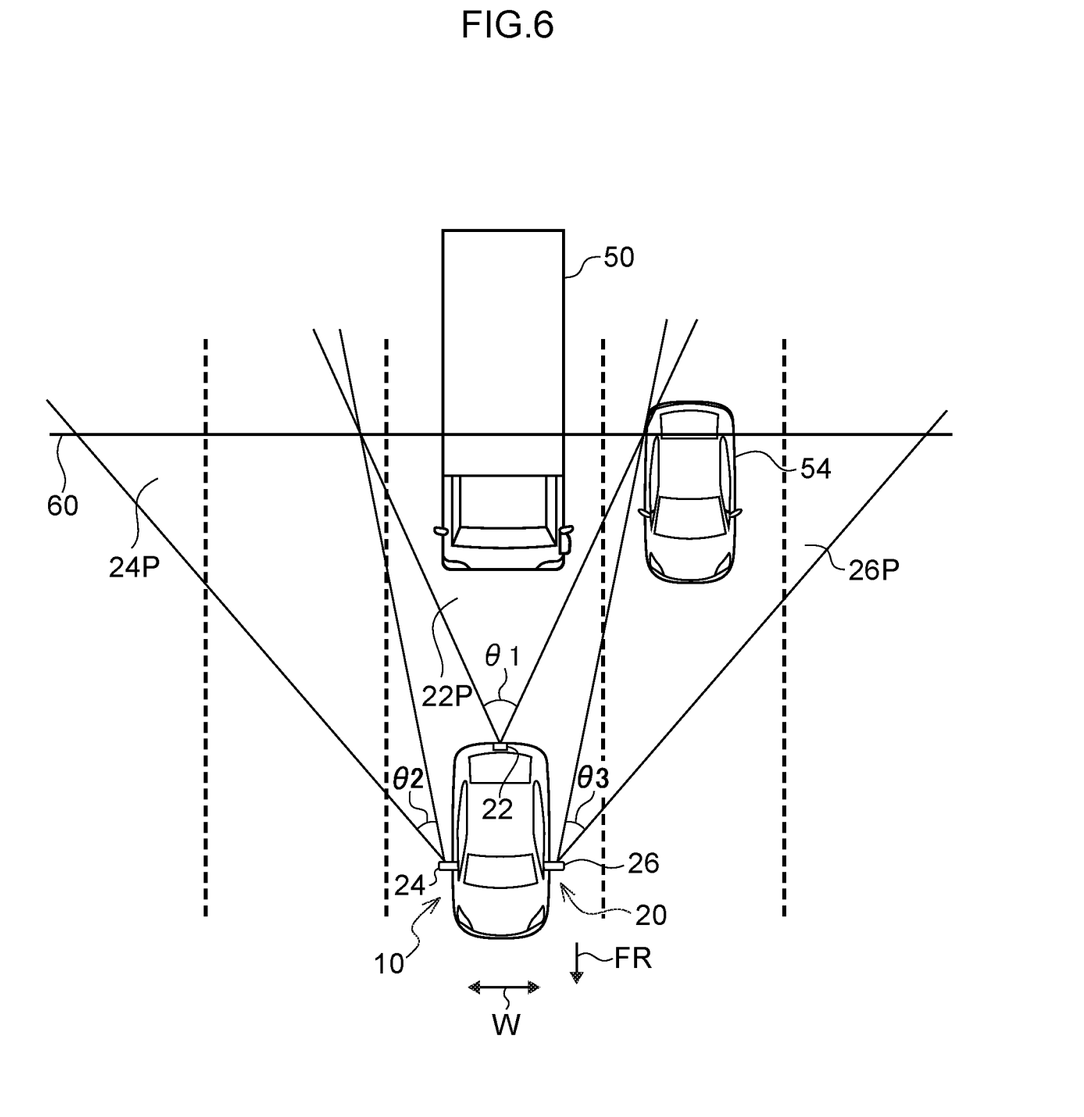
FIG. 6 is a schematic drawing for explaining a combined image in a case (a first case) in which a correspondence ratio of feature amounts in overlapping regions of images exceeds a threshold value.

The trimming of step S103 will be described further with reference to FIG. 6. FIG. 6 is a schematic drawing for explaining image combining in a case (the first case) in which the correspondence ratio of a feature amount of the image at the first overlapping region 24A and the feature amount of the image at the second overlapping region 22A exceeds a predetermined threshold value, and the correspondence ratio of a feature amount of the image at the first overlapping region 26A and the feature amount of the image at the second overlapping region 22B exceeds a predetermined threshold value.

FIG. 6 is an image drawing in which image angle θ2 of the right side camera 24, image angle θ1 of the rear camera 22, and image angle θ3 of the left side camera 26 are respectively adjusted virtually for the above-described first case. In a virtual combining plane 60 that is shown at the rear of the vehicle 10, the respective objects of imaging by the right side camera 24, the rear camera 22 and the left side camera 26 are continuous without overlapping, and the lengths thereof in the lateral direction are equal. The trimming of step S103 shown in FIG. 5 is executed in order to correspond to this. The virtual combining plane 60 shown in FIG. 6 is set at a position that is far from the vehicle 10, as compared with a virtual combining plane 62 that is shown in FIG. 8 and is described later. Note that, when the virtual combining plane 60 is set at a position that is far from the vehicle 10 as shown in FIG. 6, overlapping of the regions that are imaged by the right side camera 24, the rear camera 22 and the left side camera 26 is suppressed.

On the other hand, in step S104 that is shown in FIG. 5, the CPU 30A trims the rear image 220 and the rear lateral images 240, 260 such that the information, which is the main cause of lowering the correspondence ratio of the feature amounts, is made to remain in the rear lateral processed images 241, 261, and, as compared with the case of step S103, the length in the lateral direction of the rear processed image 221 in the combined image 281 is short and the lengths in the lateral direction of the rear lateral processed images 241, 261 are long (see FIG. 9). Then, the CPU 30A moves on to the processing of step S105.

The trimming of step S104 will be described further with reference to FIG. 8. FIG. 8 is a schematic drawing for explaining image combining in a case (the second case) that corresponds to at least one of a case in which the correspondence ratio of a feature amount of the image at the first overlapping region 24A and the feature amount of the image at the second overlapping region 22A is less than or equal to a predetermined threshold value, and a case in which the correspondence ratio of a feature amount of the image at the first overlapping region 26A and the feature amount of the image at the second overlapping region 22B is less than or equal to the predetermined value.

FIG. 8 is an image drawing in which the image angle θ2 of the right side camera 24, the image angle θ1 of the rear camera 22, and the image angle θ3 of the left side camera 26 are respectively adjusted virtually for the above-described second case. In the virtual combining plane 62 that is shown at the rear of the vehicle 10, the respective objects of imaging by the right side camera 24, the rear camera 22 and the left side camera 26 are continuous without overlapping, and the lengths in the lateral direction of the respective ranges of imaging by the right side camera 24 and the left side camera 26 are longer than that of the range of imaging by the rear camera 22. The trimming of step S104 shown in FIG. 5 is executed in order to correspond to this.

In step S105, the CPU 30A combines the rear processed image 221 and the rear lateral processed images 241, 261, and generates the single combined image 281. In next step S106, the CPU 30A displays the combined image 281, which was generated in step S105, on the display 28.

Due thereto, the combined image 281 that is shown in FIG. 7 or FIG. 9 for example is displayed on the display 28. Note that, in FIG. 9, the region surrounded by dashed frame 70 is the region where the correspondence ratio of the feature amounts has been lowered.

Next, in step S107 of FIG. 5, on the basis of, for example, whether or not the ignition switch of the vehicle 10 has been turned off or the like, the CPU 30A judges whether or not driving of the vehicle 10 has been ended. If it is judged that driving of the vehicle 10 has not been ended (step S107: N), the CPU 30A repeats the processings from step S100. If it is judged that driving of the vehicle 10 has ended (step S107: Y), the CPU 30A ends the image display control processing that is shown in FIG. 5.

The vehicle periphery monitoring device 20 changes the ratio of combining the images captured by the rear camera 22, the right side camera 24 and the left side camera 26, in accordance with whether or not the correspondence ratio of a feature amount of the image at the first overlapping region 24A, 26A and the feature amount of the image at the second overlapping region 22A, 22B, which are shown in FIG. 2A, FIG. 2B and FIG. 2C, exceeds a predetermined threshold value. Therefore, the combined image 281 that is more suitable can be obtained.

As described above, in accordance with the vehicle periphery monitoring device 20 of the first embodiment, the combined image 281 that is more suitable in accordance with the situation can be displayed by using the images that are captured respectively by the rear camera 22, the right side camera 24 and the left side camera 26 that are shown in FIG. 1 and the like.

[Second Embodiment]

A second embodiment will be described next by using FIG. 10 through FIG. 12, while again referencing FIG. 2A, FIG. 2B, FIG. 2C, FIG. 3 and the like. The vehicle periphery monitoring device relating to the present second embodiment is similar to the vehicle periphery monitoring device 20 of the first embodiment, except for the points that are described hereinafter. Portions that are similar to those of the first embodiment are denoted by the same reference numerals, and description thereof is omitted. Further, the hardware structures of the vehicle periphery monitoring device of the second embodiment are similar to the hardware structures of the vehicle periphery monitoring device 20 of the first embodiment, and therefore, FIG. 3 will be referenced again, but illustration and detailed description will be omitted.

In the present second embodiment, an image display control program, in which a portion of the image display control program described in the first embodiment has been changed, and the like are stored in the ROM 30B of the ECU 30 shown in FIG. 3.

Figure 10:
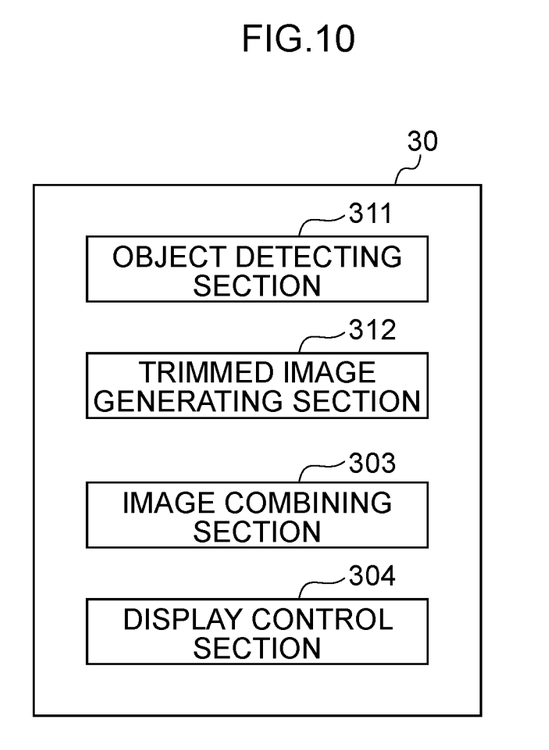
FIG. 10 is a block drawing showing an example of functional structures of the ECU of a vehicle periphery monitoring device relating to a second embodiment.

An example of the functional structures of the ECU 30 of the vehicle periphery monitoring device relating to the second embodiment is shown in a block drawing in FIG. 10. As shown in FIG. 10, the ECU 30 of the vehicle periphery monitoring device relating to the second embodiment has an object detecting section 311 instead of the feature amount computing section 301 of the first embodiment (see FIG. 4), and has a trimmed image generating section 312 instead of the trimmed image generating section 3402 of the first embodiment (see FIG. 4). The object detecting section 311, the trimmed image generating section 312, the image combining section 303 and the display control section 304 are realized by the CPU 30A reading-out and executing the image display control program of the second embodiment that is stored in the ROM 30B.

The object detecting section 311 detects objects that exist in the first overlapping regions 24A, 26A and objects that exist in the second overlapping regions 22A, 22B, respectively. Note that, for example, automobiles, motorcycles, pedestrians, traffic signals, roadside objects, and the like that exist on the road or in the periphery thereof are included among such objects.

In the same way as the trimmed image generating section 302 of the first embodiment (see FIG. 4), by trimming the rear image 220 that was captured by the rear camera 22 and the rear lateral images 240, 260 that were captured by the right side camera 24 and the left side camera 26 such that the regions that are the respective objects of imaging thereof are continuous without overlapping, the trimmed image generating section 312 generates the rear processed image 221 from the rear image 220 and generates the rear lateral processed images 241, 261 from the rear lateral images 240, 260.

Further, in the same way as the trimmed image generating section 302 of the first embodiment (see FIG. 4), in a first case in which the trimmed image generating section 312 determines that there is no "information that is included in the images of the first overlapping regions 24A, 26A and is not included in the images of the second overlapping regions 22A, 22B", or that, even if there is such information, such information is not information that should be included in the combined image 281, the trimmed image generating section 312 carries out trimming such that the respective lateral direction lengths of the rear processed image 221 and the rear lateral processed images 241, 261 that are in the combined image 281 shown in FIG. 7 are equal. In a second case in which the trimmed image generating section 312 determines that there is information that is included in the images of the first overlapping regions 24A, 26A and is not included in the images of the second overlapping regions 22A, 22B shown in FIG. 2A, FIG. 2B and FIG. 2C and information that should be included in the combined image 281, the trimmed image generating section 312 carries out trimming such that the information that should be included in the combined image 281 shown in FIG. 9 remains in the rear lateral processed images 241, 261, and, as compared with the above-described first case, the lateral direction length of the rear processed image 221 in the combined image 281 is short, and the lateral direction lengths of the rear lateral processed images 241, 261 in the combined image 281 are long.

Here, in a case in which, on the basis of the results of computation by the object detecting section 311, the trimmed image generating section 312 of the second embodiment determines that there is no object that exists only in the first overlapping regions 24A, 26A among the first overlapping regions 24A, 26A and the second overlapping regions 22A, 22B, the trimmed image generating section 312 of the second embodiment determines that there is the above-described first case. Further, in a case in which, on the basis of the results of computation by the object detecting section 311, the trimmed image generating section 312 of the second embodiment determines that there is an object that exists only in the first overlapping regions 24A, 26A among the first overlapping regions 24A, 26A and the second overlapping regions 22A, 22B, the trimmed image generating section 312 of the second embodiment determines that there is the above-described second case.

Figure 11:
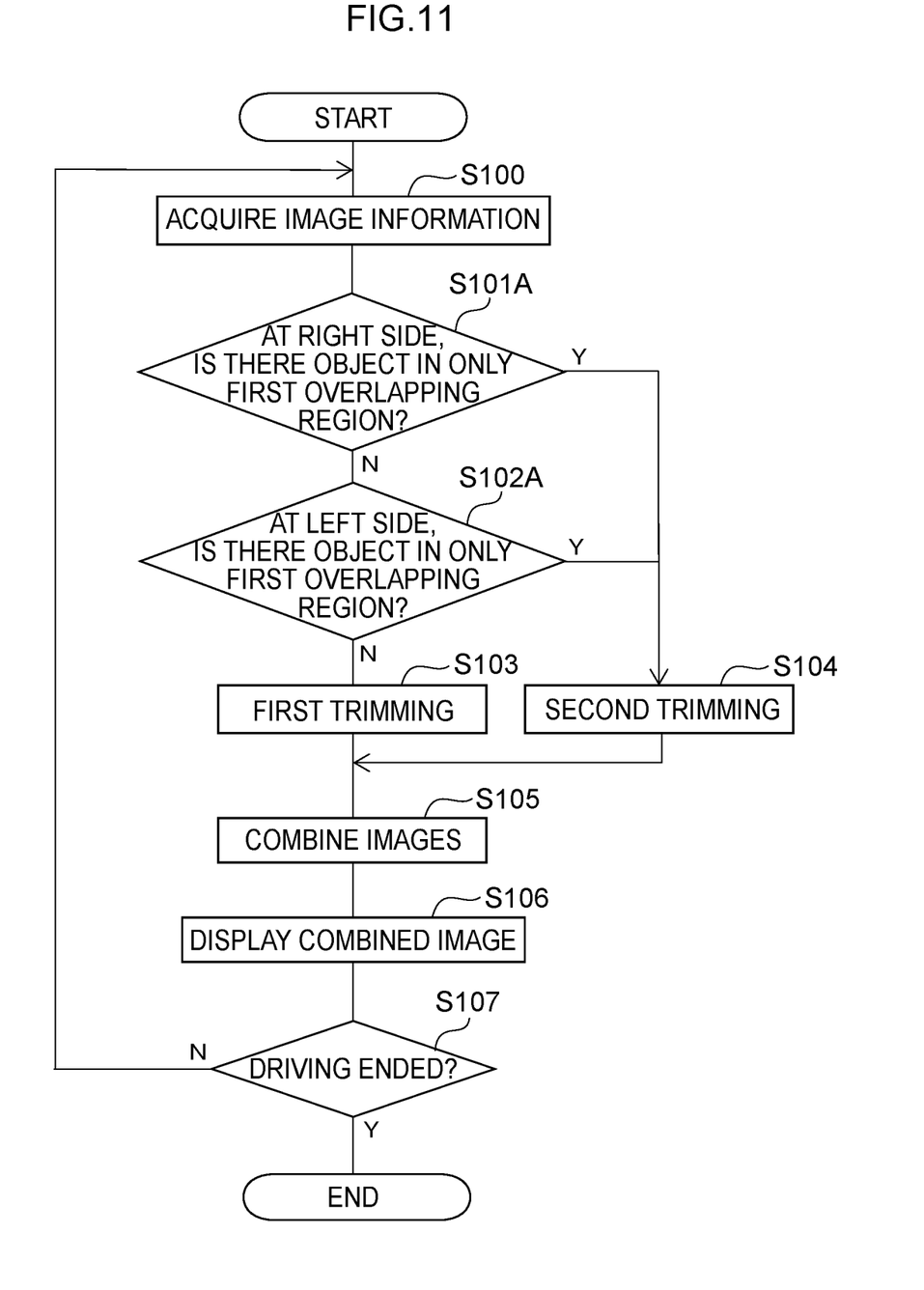
FIG. 11 is a flowchart showing an example of the flow of control processing by the ECU of the vehicle periphery monitoring device relating to the second embodiment.

An example of the flow of image display control processing by the ECU 30 of the second embodiment is shown in a flowchart in FIG. 11. The image display control processing of the second embodiment by the ECU 30 is carried out due to the CPU 30A reading-out the image display control program of the second embodiment from the ROM 30B, and expanding and executing the program in the RAM 30C. As an example, execution of the image display control processing that is shown in FIG. 11 is started in a case in which the ignition switch of the vehicle 10 is turned on.

As shown in FIG. 11, the flowchart of the second embodiment differs from the flowchart of the first embodiment (see FIG. 5) with regard to the point that step S101A is provided instead of step S101 of the first embodiment (see FIG. 5), and step S102A is provided instead of step S102 of the first embodiment (see FIG. 5). Because the other points of the flowchart of the second embodiment are similar to those of the flowchart of the first embodiment (see FIG. 5), similar steps are denoted by the same reference numerals, and description is omitted.

In step S101A, the CPU 30A judges whether or not there is an object that exists in, among the first overlapping region 24A and the second overlapping region 22A, only the first overlapping region 24A. In a case in which there is an object that exists only in the first overlapping region 24A among the first overlapping region 24A and the second overlapping region 22A (step S101A: Y), the CPU 30A moves on to the processing of step S104. On the other hand, in a case in which there is no object that exists only in the first overlapping region 24A among the first overlapping region 24A and the second overlapping region 22A (step S101A: N), the CPU 30A moves on to the processing of step S102A. Note that, for example, the motorbike 52 that is shown in FIG. 2C is recognized as an object that exists in, of the first overlapping region 24A and the second overlapping region 22A, only the first overlapping region 24A.

In step S102A that is shown in FIG. 11, the CPU 30A judges whether or not there is an object that exists in, of the first overlapping region 26A and the second overlapping region 22B, only the first overlapping region 26A. In a case in which there is an object that exists only in the first overlapping region 26A among the first overlapping region 26A and the second overlapping region 22B (step S102A: Y), the CPU 30A moves on to the processing of step S104. In a case in which there is no object that exists only in the first overlapping region 26A among the first overlapping region 26A and the second overlapping region 22B (step S102A: N), the CPU 30A moves on to the processing of step S103.

In accordance with the above-described second embodiment as well, the combined image 28I that is more suitable in accordance with the situation can be displayed by using the images that are captured respectively by the rear camera 22, the right side camera 24 and the left side camera 26.

[Supplemental Description of Embodiments]

Note that, in the above-described first and second embodiments, the image display control program is stored in the ROM 30B that is shown in FIG. 3. However, as a modified example of the above embodiments, the image display control program may be stored in the storage 30D and not the ROM 30B.

Further, any of various types of processors other than a CPU may execute the respective processings that are executed by the CPU 30A that is shown in FIG. 3 reading-in software (programs) in the above-described first and second embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the respective processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the respective programs that are described in the above embodiments may be provided in forms of being recorded on a recording medium such as a CD-ROM (Compact Disc Read Only Memory), a DVD-ROM (Digital Versatile Disc Read Only Memory), a USB (Universal Serial Bus) memory, or the like. Further, the programs may be in a form of being downloaded from an external device via a network.

Note that the above-described embodiments and the above-described modified example may be implemented by being combined appropriately.

Although examples of the present disclosure have been described above, the present disclosure is not limited to the above, and, of course, can be implemented by being modified in various ways other than the above within a scope that does not depart from the gist thereof.

What is claimed is:

1. A vehicle periphery monitoring device comprising:
 a display portion that is provided within a cabin of a vehicle, and that displays an image;
 a rear imaging section that is provided at the vehicle and captures images of a rear side of the vehicle;
 rear lateral imaging sections that are provided at the vehicle, further toward vehicle transverse direction outer sides than the rear imaging section, and that capture images of rear lateral sides of the vehicle;
 a trimmed image generating section that, by trimming a rear image captured by the rear imaging section and rear lateral images captured by the rear lateral imaging sections such that regions that are objects of imaging are continuous without overlapping, generates a rear processed image from the rear image and rear lateral processed images from the rear lateral images;
 an image combining section that combines the rear processed image and the rear lateral processed images, which were respectively generated by the trimmed image generating section, and generates a single combined image; and
 a display control section that displays the combined image, which was generated by the image combining section, on the display portion,
 wherein:
 in a first case in which the trimmed image generating section determines that there is no information that is included in images of first overlapping regions of the rear lateral images that overlap the rear image and is not included in images of second overlapping regions of the rear image that overlap the rear lateral images, or that, if there is such information, the information is not information that should be included in the combined image, the trimmed image generating section carries out trimming such that respective lateral direction lengths of the rear processed image and the rear lateral processed images in the combined image are equal, and
 in a second case in which the trimmed image generating section determines that there is information that is included in the images of the first overlapping regions and is not included in the images of the second overlapping regions and is information that should be included in the combined image, the trimmed image generating section carries out trimming such that the information that should be included in the combined image remains in the rear lateral processed images, and, as compared with the first case, the lateral direction length of the rear processed image in the combined image is shorter, and the lateral direction lengths of the rear lateral processed images in the combined image are longer.

2. The vehicle periphery monitoring device of claim 1, comprising:
a feature amount computing section that respectively computes feature amounts of images at the first overlapping regions and feature amounts of images at the second overlapping regions,
wherein the trimmed image generating section determines that the first case exists in a case of determining, based on results of computing by the feature amount computing section, that a correspondence ratio of the feature amounts of the images at the first overlapping regions and the feature amounts of the images at the second overlapping regions exceeds a predetermined threshold value, and determines that the second case exists in a case of determining, based on the results of computing by the feature amount computing section, that the correspondence ratio of the feature amounts of the images at the first overlapping regions and the feature amounts of the images at the second overlapping regions is less than or equal to the predetermined threshold value.

3. The vehicle periphery monitoring device of claim 1, comprising:
an object detecting section that respectively detects objects that are present in the first overlapping regions and objects that are present in the second overlapping regions,
wherein the trimmed image generating section determines that the first case exists in a case of determining, based on results of detection by the object detecting section, that no object is present only in the first overlapping regions among the first overlapping regions and the second overlapping regions, and determines that the second case exists in a case of determining, based on the results of detection by the object detecting section, that an object is present only in the first overlapping regions among the first overlapping regions and the second overlapping regions.

* * * * *